(12) United States Patent
Miyazawa et al.

(10) Patent No.: US 10,567,023 B2
(45) Date of Patent: Feb. 18, 2020

(54) INDICATOR DETECTING DEVICE

(71) Applicant: Wacom Co., Ltd., Saitama (JP)

(72) Inventors: Hiroshi Miyazawa, Kanagawa (JP); Toshihiko Horie, Saitama (JP); Nobutaka Ide, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 413 days.

(21) Appl. No.: 15/200,526

(22) Filed: Jul. 1, 2016

(65) Prior Publication Data

US 2017/0054467 A1 Feb. 23, 2017

(30) Foreign Application Priority Data

Aug. 19, 2015 (JP) .................................. 2015-161501

(51) Int. Cl.
*G06F 3/02* (2006.01)
*H04B 1/3888* (2015.01)
(Continued)

(52) U.S. Cl.
CPC ......... *H04B 1/3888* (2013.01); *G06F 1/1628* (2013.01); *G06F 1/1632* (2013.01); *G06F 3/044* (2013.01); *G06F 3/046* (2013.01); *G06Q 20/204* (2013.01); *G06Q 20/24* (2013.01); *G06Q 20/34* (2013.01); *G06Q 20/3829* (2013.01); *H04M 1/72575* (2013.01); *G06F 2200/1634* (2013.01); *G06Q 2220/00* (2013.01); *H04M 1/04* (2013.01);
(Continued)

(58) Field of Classification Search
CPC . G06F 3/02; G06F 3/041; G06F 3/045; G06F 1/16; G09G 5/00; G06K 11/06; G08C 21/00; H05K 7/14
See application file for complete search history.

(56) References Cited

U.S. PATENT DOCUMENTS

2003/0020999 A1* 1/2003 Tsujimura ............. G06F 1/1616
359/245
2005/0062715 A1* 3/2005 Tsuji ....................... G06F 1/162
345/158
(Continued)

FOREIGN PATENT DOCUMENTS

| EP | 2 287 702 A1 | 2/2011 |
| JP | 2012-43182 A | 3/2012 |
| JP | 2014-132372 A | 7/2014 |

OTHER PUBLICATIONS

*Surface Tablet: Microsoft Store.* Microsoft, Web. Accessed Jun. 17, 2016. <https://www.microsoftstore.com/store/msjp/ja_JP/cat/surface/categoryID.66238700>.
(Continued)

*Primary Examiner* — Pegeman Karimi
(74) *Attorney, Agent, or Firm* — Seed IP Law Group LLP

(57) ABSTRACT

A sensing device has a detection portion having a plate shape and including a first set of one or more indication sensors and a securing portion extending from the detection portion. The securing portion secures the device to a piece of electronic equipment having a plate shape, a back and a front, the front including a display with a second set of one or more indication sensors. The securing portion is sized and shaped to fit between the back of the piece of electronic equipment and a base part of a protective cover to secure the device to the piece of electronic equipment.

17 Claims, 6 Drawing Sheets

(51) Int. Cl.
    *G06F 1/16*     (2006.01)
    *G06Q 20/20*     (2012.01)
    *G06Q 20/24*     (2012.01)
    *G06Q 20/34*     (2012.01)
    *G06Q 20/38*     (2012.01)
    *G06F 3/044*     (2006.01)
    *G06F 3/046*     (2006.01)
    *H04M 1/725*     (2006.01)
    *H04M 1/04*     (2006.01)

(52) U.S. Cl.
    CPC .... *H04M 2250/04* (2013.01); *H04M 2250/12* (2013.01)

(56) References Cited

U.S. PATENT DOCUMENTS

| | | | |
|---|---|---|---|
| 2011/0096513 A1* | 4/2011 | Kim | G06F 1/1626 361/747 |
| 2012/0194448 A1* | 8/2012 | Rothkopf | A45C 13/002 345/173 |
| 2012/0284572 A1* | 11/2012 | Shirakawa | G06F 17/30327 714/54 |
| 2013/0170126 A1* | 7/2013 | Lee | G06F 1/1654 361/679.17 |
| 2014/0104761 A1* | 4/2014 | Hsu | H05K 7/1401 361/679.01 |
| 2014/0205799 A1 | 7/2014 | Lin et al. | |
| 2015/0324605 A1* | 11/2015 | Yoon | G06F 21/31 726/28 |
| 2016/0170448 A1* | 6/2016 | Michino | G06F 1/1616 361/679.06 |

OTHER PUBLICATIONS

Extended European Search Report, dated Jan. 2, 2017, for corresponding EP Application No. 16183595.4-1959, 10 pages.

* cited by examiner

INDICATOR DETECTING DEVICE

BACKGROUND

1. Technical Field

The present disclosure relates to an indicator detecting device, such as an indicator detecting device used with a tablet terminal and a protective cover therefor.

2. Description of the Related Art

Tablet terminals, which have become significantly popular in recent years, are generally formed into a thin plate shape having a touch panel exposed in the front surface. Therefore, protective covers for protecting the touch panel have become popular together with the tablet terminals. One example of such a protective cover is disclosed in Japanese Patent Laid-open No. 2012-043182 and Japanese Patent Laid-open No. 2014-132372.

Furthermore, an example in which an input device such as a keyboard and a mouse is attached as an external device to a tablet terminal is known. For example, a product made by connecting an external keyboard to a tablet terminal is disclosed in a product introduction site of Surface, which is a registered trademark of Microsoft Corporation.

Typically, there are needs of consumers to carry out pen input on the basis of an indicator detection system different from the indicator detection system of a touch panel of a tablet terminal while using the tablet terminal. For example, there is a need to carry out pen input on the basis of the electro-magnetic resonance technology (EMR) system or the electrostatic (ES) system, which enables input with higher accuracy than the capacitive system, while using a tablet terminal having a touch panel of the capacitive system.

It is conceivable that an indicator detecting device (digitizer) compatible with the EMR system or the ES system is connected as one of external input devices to a tablet terminal in order to meet such a need. This makes it possible to use the indicator detecting device compatible with the EMR system or the ES system as an input device of the tablet terminal.

However, with this configuration, the user needs to carry both the tablet terminal and the indicator detecting device with the user, which is inconvenient for the user. Furthermore, also in use, the indicator detecting device and the tablet terminal are lined up in the direction of the line of sight of the user and are used. Therefore, there is a problem that it is difficult to use the tablet terminal in the case in which there is not sufficient space, such as the case in which the tablet terminal is used on a seat table in a bullet train, for example.

In contrast, for example according to a configuration of the product discussed above, a keyboard may be formed on a surface of a protective cover. Thus, the above-described problem does not occur if the keyboard is replaced by an indicator detecting device. However, this configuration requires the dedicated protective cover and therefore is not realistic generally, aside perhaps from the case in which the protective cover and the tablet terminal are integrally sold by the same company. Furthermore, originally the product discussed above is a product whose largest advantage is that the product has a hardware keyboard although being a tablet terminal, and equipping the product with an indicator detecting device instead of the keyboard is not realistic.

BRIEF SUMMARY

In an embodiment, an indicator detecting device uses a general-purpose protective cover and can be carried around integrally with a tablet terminal and can be connected to the tablet terminal and comfortably used even when there is not sufficient space.

In an embodiment, an indicator detecting device used with electronic equipment is formed into a plate shape having a front surface and a back surface and includes a display unit formed in the front surface. The display unit has a function as a first sensor that detects a first indicator on the basis of a first detection system in addition to a display function. The indicator detecting device may be used also with a protective cover configured to have a base part fixed to the electronic equipment in such a manner as to cover the back surface and a flap part attached to the base part in such a manner that the protective cover is capable of taking either one of a first state in which the flap part exists at a position opposed to the display unit and a second state in which the flap part exists at a position more distant from the display unit than in the first state. In an embodiment, the indicator detecting device includes an indicator detecting unit configured to be formed into a plate shape and having a second sensor for detecting a second indicator on the basis of a second detection system. In an embodiment, the indicator detecting unit is located between the flap part and the front surface when the protective cover is in the first state. In an embodiment, the indicator detecting device includes an insertion unit configured to have a shape protruding from a side surface of the indicator detecting unit and to fix the indicator detecting unit to the electronic equipment by being inserted in between the base part and the back surface.

In an embodiment, an indicator detecting device is separate from the protective cover and a general-purpose protective cover can be used as the protective cover. In an embodiment, when the protective cover is closed (first state), the state in which the indicator detecting device is sandwiched between the protective cover and the electronic equipment may be obtained and facilitate carrying around the electronic equipment and the indicator detecting device integrally. In an embodiment, when the protective cover is opened (second state), the indicator detecting unit may be deployed in front of the display unit (as viewed from the user) while being fixed to the electronic equipment. This may facilitate comfortably use of the indicator detecting device, with the indicator detecting device connected to the electronic equipment, even when in a crowded space.

In an embodiment, a device comprises: a detection portion having a plate shape and including a first set of one or more indication sensors, which, in operation, detects one or more indications; and a securing portion extending from the detection portion and configured to secure the device to a piece of electronic equipment having a plate shape, a back and a front, the front including a display with a second set of one or more indication sensors, wherein the securing portion is sized and shaped to fit between the back of the piece of electronic equipment and a base part of a protective cover to secure the device to the piece of electronic equipment. In an embodiment, the device comprises: a transmitter, which, in operation, transmits signals to the piece of electronic equipment based on indications detected by the first set of one or more indication sensors. In an embodiment, the securing portion is secured between the back of the piece of electronic equipment and the base part of the protective cover by friction. In an embodiment, the protective cover has a flap and when the flap is in a closed position, the first set of one or more indication sensors face the second set of one or more indication sensors. In an embodiment, the first set of one or more indication sensors comprises a plurality of electrodes positioned in a front surface of the detection portion. In an embodiment, at least one of the first set of one or more indication sensors is of a type different than a type of at least one of the second set of one or more indication sensors. In an embodiment, the securing portion has a rectangular shape with a side joined to a side surface of the detection portion. In an embodiment, a first part of the securing portion has a triangular shape with a base joined to the side surface of the detection portion and a friction coefficient higher than a friction coefficient of a second part of the securing portion. In an embodiment, the securing portion has a triangular shape with a base region joined to a side surface of the detection portion. In an embodiment, the securing portion has a friction coefficient in a vertex region which is lower than a friction coefficient of the base region. In an embodiment, the protective cover has a flap and the device comprises means for securing the detection portion to the flap. In an embodiment, the device comprises: a sensor, which, in operation, detects an orientation of the detection portion with respect to the securing portion. In an embodiment, the detection portion, in operation: acquires identification information; acquires a signature image; encrypts the identification information and the signature image based on an encryption key; and transmits the encrypted identification information and the signature page to the piece of electronic equipment.

In an embodiment, a system comprises: a first sensing device having: a plate-shaped body including one or more sensors; and a protrusion extending from the body; and a protective cover having a base sized and shaped to receive a second plate-shaped sensing device, the base having an opening sized and shaped to receive the protrusion, wherein the protrusion is sized and shaped to fit securely between the base and a back of the second sensing device to secure the first sensing device to the second sensing device. In an embodiment, the system comprises: the second sensing device. In an embodiment, the first sensing device comprises a communication interface, which, in operation, communicatively couples the first sensing device to the second sensing device. In an embodiment, the first sensing device is of a type different that a type of the second sensing device.

In an embodiment, a system comprises: a first sensing device having a plate-shaped body and including one or more sensors; means for protecting a second sensing device, the second sensing device having a plate-shaped body; and means for securing the first sensing device to the means for protecting the second sensing device. In an embodiment, the system comprises: the second sensing device. In an embodiment, the system comprises: means for communicatively coupling the first sensing device to the second sensing device.

BRIEF DESCRIPTION OF THE DRAWINGS

FIG. 1A depicts a state in which the digitizer is removed from the protective cover and the tablet terminal; and FIG. 1B depicts a state in which the digitizer is attached to the protective cover and the tablet terminal;

FIG. 2A depicts a state in which the protective cover is closed; FIG. 2B depicts a state in which the protective cover is opened; and FIG. 2C depicts a state in which the protective cover is folded into a stand shape;

FIG. 5A depicts an example in which the insertion unit is formed into a shape of a triangle whose base is joined to the side surface of the indicator detecting unit; and FIGS. 5B and 5C depict examples in which the insertion unit is formed of two members having different friction coefficients;

FIG. 7A depicts the configuration of each of the indicator detecting unit and the tablet terminal according to the present modification example; and FIG. 7B depicts a flow diagram depicting the flow of processing according to the present modification example.

DETAILED DESCRIPTION

Example embodiments will be described in detail below with reference to the accompanying drawings.

Figure 1A:
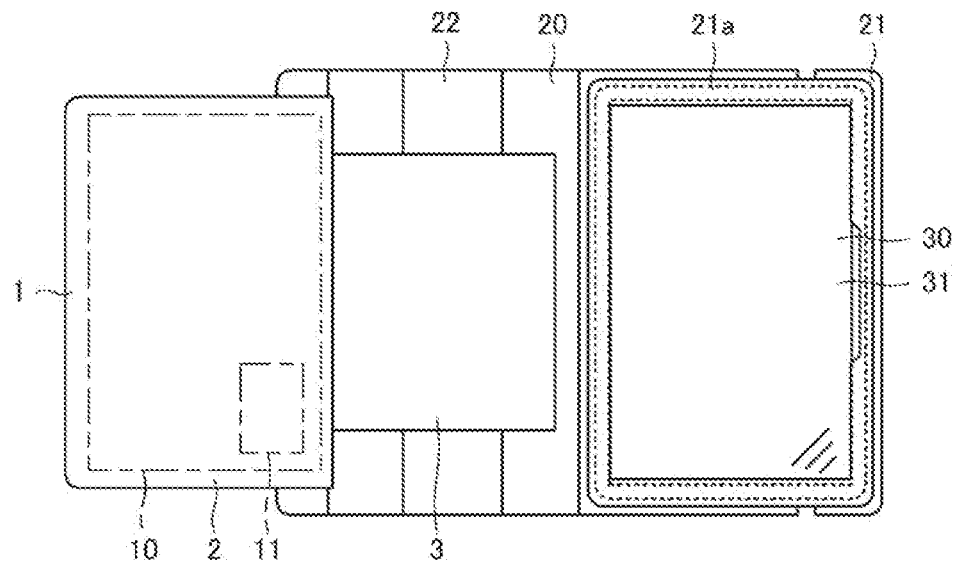
FIGS. 1A and 1B are top views of a digitizer, a protective cover, and a tablet terminal according to an embodiment.
Figure 1B:
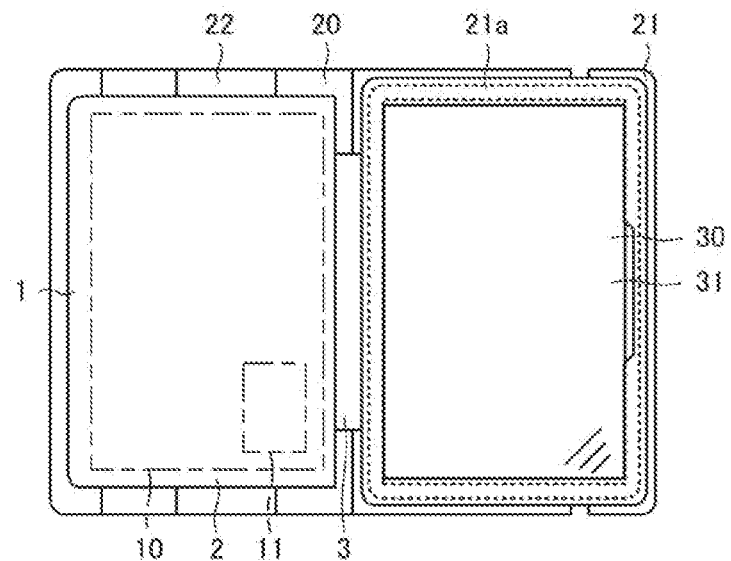
Figure 2A:
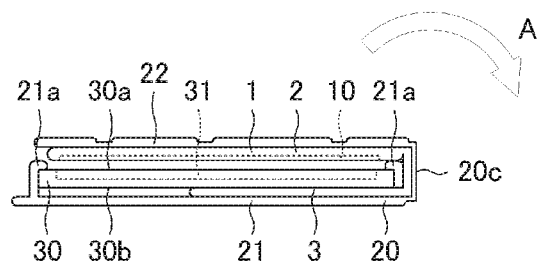
FIGS. 2A, 2B, and 2C are sectional views of the digitizer, the protective cover, and the tablet terminal depicted in FIGS. 1A and 1B.
Figure 2B:
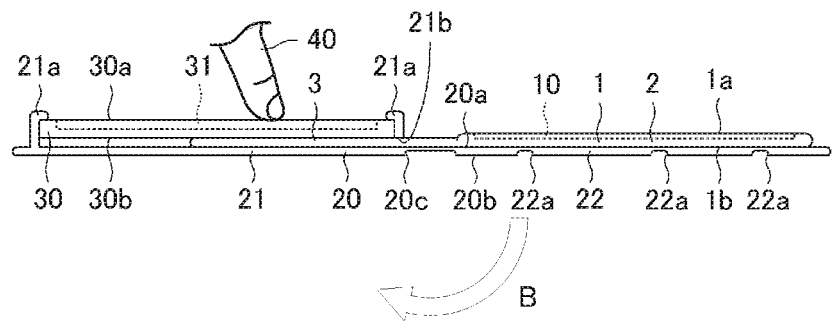
Figure 2C:
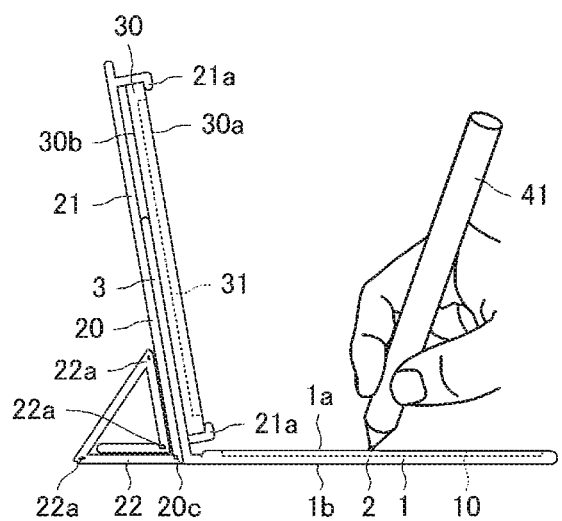

FIGS. 1A and 1B and FIGS. 2A to 2C are each a diagram depicting a digitizer 1, a protective cover 20, and a tablet terminal 30 according to the present embodiment. FIG. 1A depicts a state in which the digitizer 1 is removed from the protective cover 20 and the tablet terminal 30, and FIG. 1B depicts a state in which the digitizer 1 is attached to the protective cover 20 and the tablet terminal 30. Furthermore, FIG. 2A depicts a state in which the protective cover 20 is closed. FIG. 2B depicts a state in which the protective cover 20 is opened. FIG. 2C depicts a state in which the protective cover 20 is folded into a stand shape.

The tablet terminal 30 is electronic equipment formed into a rectangular plate shape and is configured to have a front surface 30a and a back surface 30b as depicted in FIG. 2B for example. A display unit 31 is disposed in the front surface 30a. The display unit 31 is configured to include a liquid crystal display device and a transparent touch sensor (hereinafter, often referred to as the "first sensor") disposed thereon although not depicted in the diagram. Besides, the tablet terminal 30 may also have a central processing unit (CPU), a memory, a wireless communication section, and so forth (not depicted).

The first sensor is a sensor that functions as an input section when a user uses the tablet terminal 30. Because the first sensor is transparent, the user who uses the tablet terminal 30 can carry out touch input in the first sensor while viewing the display screen of the liquid crystal display device. Generally, the detection system of the first sensor may be a capacitive system (first detection system). The first sensor in this case can detect a finger 40 depicted in FIG. 2B. Besides, the first sensor can also detect an electronic pen (not depicted) compatible with the capacitive system.

The protective cover 20 is a cover made of leather for example and is configured to have a front surface 20a and a back surface 20b as depicted in FIG. 2B for example. Furthermore, the protective cover 20 is configured to have a base part 21 fixed to the tablet terminal 30 in such a manner as to cover the back surface 30b and a flap part 22 formed monolithically with the base part 21.

The protective cover 20 is formed into a rectangular plate shape. When the protective cover 20 is divided into two segments across the central part in the longitudinal direction, one segment may serve as the base part 21 and the other segment may serve as the flap part 22. Therefore, the base part 21 and the flap part 22 also may be rectangles. The size of the protective cover 20 may be set that the size of each of the base part 21 and the flap part 22 is slightly larger than the tablet terminal 30 and the longitudinal direction of each of the base part 21 and the flap part 22 is orthogonal to the longitudinal direction of the protective cover 20.

The base part 21 is configured to have a housing part 21a for housing the plate-shaped tablet terminal 30 on the side of the front surface 20a. The housing part 21a is a member provided to protrude from the surface of the base part 21 on the side of the front surface 20a. As depicted in FIG. 1A for example, the housing part 21a is configured to be capable of gripping the whole circumference of the side surface of the tablet terminal 30 and exposing the display unit 31 of the tablet terminal 30. When the tablet terminal 30 is housed in the protective cover 20, the tablet terminal 30 is fitted into the inside of this housing part 21a. At one part of the housing part 21a close to the flap part 22, an opening 21b through which to insert the digitizer 1 (part of an insertion unit 3 to be described later) is made as depicted in FIG. 2B. The housing part 21a may be formed of a rubber band provided at each of the four corners of the base part 21 for example. In this case, a space between two of the rubber bands may serve as the opening 21b. In an embodiment, base part 21 may be rubber with the tablet held in place by the elastic force of the rubber. A hole 21b on the housing part 21a facilitates insertion of unit 3. In an embodiment, housing part 21a may comprise plastic or other materials around the tablet. In an embodiment, an opening 21b, such as a U-shaped opening, facilitates insertion of the tablet terminal 30 and the unit 3.

At the boundary part between the base part 21 and the flap part 22, a folding part 20c extending along the longitudinal direction of the base part 21 and the flap part 22 (transverse direction of the protective cover 20) is formed. Furthermore, in the flap part 22, three folding parts 22a each extending along the longitudinal direction of the flap part 22 are formed as depicted in FIG. 2B. These folding parts 22a and 20c allow the protective cover 20 to take at least three states as depicted in FIGS. 2A to 2C.

A first state is the state in which, as depicted in FIG. 2A, the flap part 22 is disposed opposed to the front surface 30a of the tablet terminal 30 by setting each of the three folding parts 22a to the extended state and folding the flap part 22 at the folding part 20c toward the side of the front surface 20a. Hereinafter, this state will be often referred to as the "first state." In the first state, the display unit 31 of the tablet terminal 30 is covered by the flap part 22 and thus the user cannot use the tablet terminal 30.

A second state is the state in which, as depicted in FIG. 2B, the flap part 22 is disposed in the same plane as the base part 21 by setting each of the folding parts 22a and 20c to the extended state. Hereinafter, this state will be often referred to as the "second state a." The second state a is obtained by, in the above-described first state, causing the rotational movement of the flap part 22 around the folding part 20c in a direction of an arrow A depicted in FIG. 2A. In the second state a, the flap part 22 exists at a position more distant from the display unit 31 than in the first state and the display unit 31 of the tablet terminal 30 is set open. As a result, the user can carry out various kinds of input to the tablet terminal 30 by moving the finger 40 or the like on the display unit 31.

A third state is the state in which, as depicted in FIG. 2C, the flap part 22 is folded into a triangle on the side of the back surface 30b of the tablet terminal 30 by folding the flap part 22 at the folding part 20c toward the side of the back surface 20b and folding each of the three folding parts 22a toward the side of the back surface 20b. The flap part 22 folded into the triangle functions as a stand for causing the tablet terminal 30 to stand up with respect to the placement surface. Hereinafter, this state will be often referred to as the "second state b." The second state b is obtained by, in the above-described second state a, causing the rotational movement of the flap part 22 around the folding part 20c in a direction of an arrow B depicted in FIG. 2B and sequentially folding the three folding parts 22a. In the second state b, the flap part 22 exists at a position more distant from the display unit 31 than in the first state and the display unit 31 of the tablet terminal 30 is set open similarly to the second state a. Thus, the user can carry out various kinds of input to the tablet terminal 30 by moving the finger 40 on the display unit 31. In an embodiment, having the display unit 31 in the standing state with respect to the placement surface of the tablet terminal 30 may facilitate carrying out input to the digitizer 1 by using an electronic pen 41 to be described later rather than to carry out input to the display unit 31 by using the finger 40.

As depicted in FIG. 1A for example, the digitizer 1 is a device having a plate-shaped indicator detecting unit 2 and the insertion unit 3 having a shape protruding from the side surface of this indicator detecting unit 2. The digitizer 1 is configured to have a front surface 1a and a back surface 1b as depicted in FIG. 2B. In an embodiment, the digitizer 1 is a device of a separate body from both the protective cover 20 and the tablet terminal 30 and is configured to be attachable and detachable to and from them.

The indicator detecting unit 2 is configured to have a touch sensor 10 (second sensor) configured to be capable of detecting the electronic pen 41 (second indicator) exemplified in FIG. 2C, and a transmitting unit 11 (see FIG. 1A) that transmits a signal (position indication signal) corresponding to an indicated position (position indicated by the electronic pen 41) detected by this touch sensor 10 to the tablet terminal 30.

The touch sensor 10 may be formed of plural electrodes provided in the front surface 1a in a lattice manner (including plural electrodes extending along one direction in the touch surface and plural electrodes extending along another direction in the touch surface orthogonal to this one direction, not depicted). In an embodiment, the detection system of the touch sensor 10 may be a system enabling pen input with higher accuracy than the detection system of the display unit 31 (as described above, generally the capacitive system), such as the above-described EMR system or the ES system, for example. However, the detection system of the touch sensor 10 is not limited to them and the same capacitive system as the display unit 31 may be used. Alternatively, it is also possible to employ another detection system such as a pressure sensing system. Furthermore, it is possible for the size of the touch sensor 10 to be the same as the screen size of the display unit 31 in order to enable intuitive pen input. However, it is not essential to equalize the sizes in this manner and the size of the touch sensor 10 may be smaller or larger than the screen size of the display unit 31 for example.

When a user moves the electronic pen 41 on the indicator detecting unit 2, a series of coordinate data indicating the locus of the electronic pen 41 is detected by the indicator detecting unit 2. The transmitting unit 11 is configured to generate a position indication signal including the detected coordinate data and transmit the position indication signal to the tablet terminal 30 when the coordinate data is detected in this manner. In the position indication signal, besides the coordinate data, a writing pressure indicating the force with which the electronic pen 41 presses the touch sensor 10, information indicating whether a side switch of the electronic pen 41 is in the on-state or in the off-state, identification information of the electronic pen 41, and so forth can be included. The tablet terminal 30 is configured to receive the position indication signal transmitted by the transmitting unit 11 and treat the position indication signal as the result of touch input similarly to the case of touch input on the display unit 31. This causes the touch sensor 10 to also function as an input section when the user uses the tablet terminal 30 as with the first sensor in the display unit 31.

Meanwhile, in order for the indicator detecting unit 2 to operate, operating power may be supplied to the indicator detecting unit 2 by any method. A battery may be provided in the indicator detecting unit 2 for this purpose. In an embodiment, a configuration may facilitate the supply of the operating power from the tablet terminal 30. In the following, this point will be described in conjunction with the communication system of the transmitting unit 11 with reference to FIGS. 3A to 3D and FIG. 4.

Figure 3A:
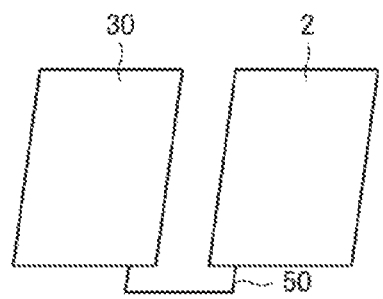
FIG. 3A is a diagram depicting an example in which the digitizer is connected to the tablet terminal by a cable.

FIG. 3A is a diagram depicting an example in which the digitizer 1 (indicator detecting unit 2) is connected to the tablet terminal 30 by a cable 50. In this case, the transmitting unit 11 transmits the position indication signal by wired communications using the cable 50. Furthermore, the operating power of the indicator detecting unit 2 may be supplied from the tablet terminal 30 to the digitizer 1 via the cable 50.

Figure 3B:
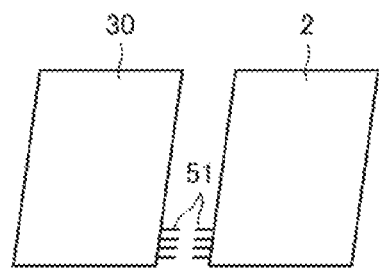
FIG. 3B is a diagram depicting an example in which each of the digitizer and the tablet terminal is provided with plural contacts configured to be connectable to each other.

FIG. 3B is a diagram depicting an example in which each of the digitizer 1 (indicator detecting unit 2) and the tablet terminal 30 is provided with plural contacts 51 configured to be connectable to each other. In this case, the transmitting unit 11 transmits the position indication signal through the contacts 51. Furthermore, the operating power of the indicator detecting unit 2 is supplied from the tablet terminal 30 to the digitizer 1 via the contacts 51.

Figure 3C:
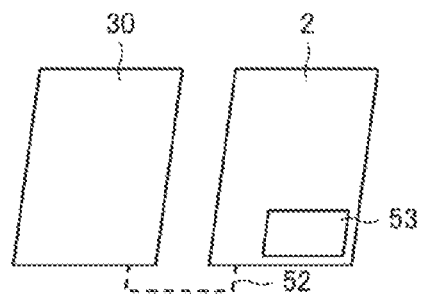
FIGS. 3C and 3D are diagrams depicting examples in which the digitizer is connected to the tablet terminal by a wireless link.
Figure 3D:
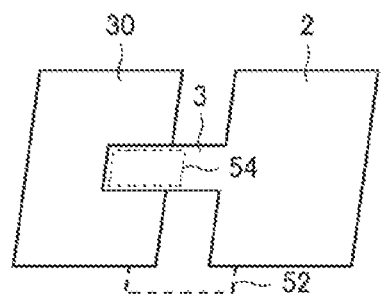

FIGS. 3C and 3D are both a diagram depicting an example in which the digitizer 1 (indicator detecting unit 2) is connected to the tablet terminal 30 by a wireless link 52. In this case, the transmitting unit 11 transmits the position indication signal by wireless communications using the wireless link 52. Besides, it is impossible to send power by the wireless link 52. Thus, in this case, the digitizer 1 may be provided with a battery 53 as depicted in FIG. 3C. Furthermore, as depicted in FIG. 3D, a near field communication (NFC)-compatible unit 54 may be provided on the side of the digitizer 1 and a reader/writer (not depicted) of an NFC card may be provided on the side of the tablet terminal 30, and power may be supplied from the tablet terminal 30 to the digitizer 1 by transmitting power from this reader/writer to the NFC-compatible unit 54. In this case, an embodiment may provide the NFC-compatible unit 54 in the insertion unit 3 and provide the reader/writer on the side of the tablet terminal 30 at the position opposed to the NFC-compatible unit 54 when the insertion unit 3 is inserted in between the base part 21 and the back surface 30b as described later.

Figure 4:
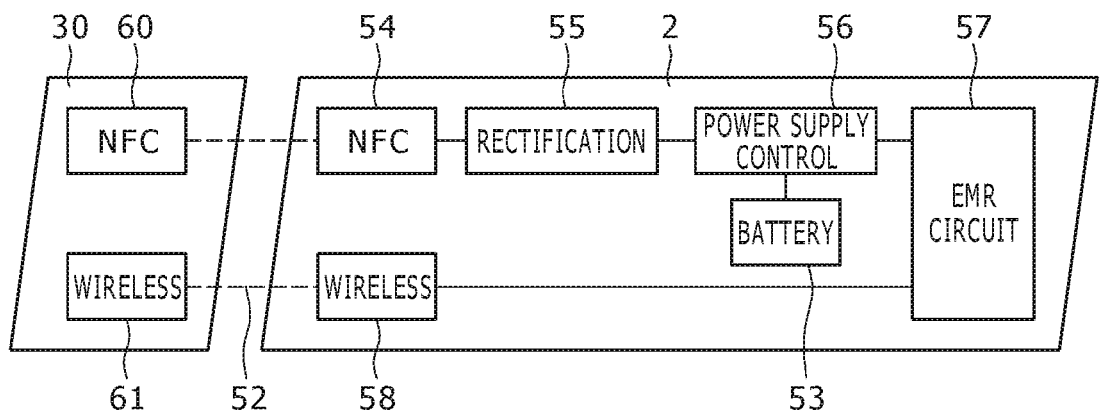
FIG. 4 is a diagram depicting an example in which the digitizer is configured to have both a battery depicted in FIG. 3C and an NFC-compatible unit depicted in FIG. 3D.

It is also possible for the digitizer 1 to be configured to have both the battery 53 depicted in FIG. 3C and the NFC-compatible unit 54 depicted in FIG. 3D. FIG. 4 is a diagram depicting an example of the internal configuration of the digitizer 1 configured in this manner. As depicted in FIG. 4, the digitizer 1 in this case is configured to have the battery 53, the NFC-compatible unit 54, a rectifying unit 55, a power supply control unit 56, an EMR circuit 57, and a wireless communication unit 58. Furthermore, the tablet terminal 30 is provided with an NFC-compatible unit 60 and a wireless communication unit 61.

The EMR circuit 57 is a circuit including the touch sensor 10 based on the EMR system. In the case of configuring the indicator detecting unit 2 on the basis of another system such as the ES system, a circuit including the touch sensor 10 based on the other system is provided instead of the EMR circuit 57. The EMR circuit 57 is configured to supply the above-described position indication signal to the wireless communication unit 58 when generating the position indication signal. The wireless communication unit 58 is the transmitting unit 11 (see FIG. 1A) compatible with wireless communications by the wireless link 52 and sends out the position indication signal supplied from the EMR circuit 57 to the wireless link 52. The wireless communication unit 61 receives the position indication signal sent out to the wireless link 52 in this manner and supplies the position indication signal to the CPU (not depicted) of the tablet terminal 30.

The NFC-compatible unit 60 is a reader/writer of an NFC card and is configured to generate a magnetic field by a coil (not depicted). The NFC-compatible unit 54 is configured to generate an alternating current (AC) current on the basis of electrostatic induction when entering the inside of this magnetic field. The AC current generated by the NFC-compatible unit 54 goes through rectification by the rectifying unit 55 and the resulting current is supplied to the power supply control unit 56 as a direct current (DC) current. The power supply control unit 56 is configured to generate a supply voltage on the basis of this DC current and provide the supply voltage to the EMR circuit 57 when being supplied with this DC current. On the other hand, the power supply control unit 56 is configured to provide a supply voltage to the EMR circuit 57 by connecting the battery 53 to the EMR circuit 57 when being not supplied with this DC current.

The connection systems between the digitizer 1 and the tablet terminal 30 described thus far are each a system relating to the physical layer. For transmission of a position indication signal from the digitizer 1 to the tablet terminal 30, a connection in an upper layer (application layer and so forth) may also be employed. Regarding this connection in the upper layer, for example, the connection of the physical layer may be constantly monitored in at least one of the digitizer 1 and the tablet terminal 30 and the connection may be started by employing the connection of the physical layer as a trigger. Furthermore, the connection in the upper layer may be started by employing activation of an application (e.g., a determined application such as an application for using the digitizer 1) by e.g. a user on the tablet terminal 30 as a trigger.

In the case of employing the activation of an application as a trigger for the start of the connection of the upper layer, supply of operating power to the digitizer 1 may also be started simultaneously with the connection of the upper layer. This enables power saving of the tablet terminal 30 and can also prevent erroneous operation of the digitizer 1.

Referring back to FIGS. 1A and 1B, the insertion unit 3 is a rectangular member that protrudes to extend in the transverse direction of the indicator detecting unit 2 from the central part of one side surface of the indicator detecting unit 2 in the transverse direction and is joined to the side surface of the indicator detecting unit 2 at one side of the rectangle as depicted in FIG. 1A. When the digitizer 1 is mounted to the protective cover 20 and the tablet terminal 30, as depicted in FIG. 2B and FIG. 1B, the insertion unit 3 is inserted in between the base part 21 of the protective cover 20 and the back surface 30*b* of the tablet terminal 30 through the opening 21*b* made in the housing part 21*a* of the protective cover 20. The insertion unit 3 inserted in this manner may be gripped between the base part 21 and the back surface 30*b* by friction against at least either one of the base part 21 and the back surface 30*b*. The insertion unit 3 is fixed to the tablet terminal 30 in this manner and thereby the mounting of the digitizer 1 to the protective cover 20 and the tablet terminal 30 is completed. Furthermore, the insertion unit 3 may be formed freely foldably at least in the vicinity of its base part (part joined to the indicator detecting unit 2). This allows the digitizer 1 to keep the state of being mounted to the protective cover 20 and the tablet terminal 30 whichever of the respective states depicted in FIGS. 2A to 2C the protective cover 20 takes.

A detailed description will be made about the state of the digitizer 1 corresponding to the respective states of the protective cover 20 with reference to FIGS. 2A to 2C. First, in the first state depicted in FIG. 2A, the digitizer 1 is in the state in which the indicator detecting unit 2 is sandwiched between the flap part 22 and the front surface 30*a*. In this case, because the touch sensor 10 is opposed to the display unit 31, the user can carry out neither input to the touch sensor 10 nor input to the display unit 31. The first state is suitable for the case of carrying around the tablet terminal 30 together with the digitizer 1.

Next, in the second state a depicted in FIG. 2B, the digitizer 1 is in the state in which the touch sensor 10 is oriented in the same direction as the display unit 31 and is disposed side by side with the display unit 31. In this case, the user can carry out both input to the touch sensor 10 and input to the display unit 31. The second state a is suitable for a situation in which two opposing users have a discussion with the intermediary of one tablet terminal 30 between them for example.

Lastly, in the second state b depicted in FIG. 2C, the digitizer 1 is in the state in which the indicator detecting unit 2 is disposed in front of the display unit 31 (as viewed from the user) caused to stand up with respect to the placement surface. In this case, with a sense of use similar to that in input to a desktop or notebook computer, the user can carry out touch input by the electronic pen 41 to the digitizer 1 while viewing displaying on the display unit 31. In the second state b, the digitizer 1 is fixedly disposed immediately close to the tablet terminal 30 and thus the occupancy space is suppressed to the minimum. Therefore, the second state b facilitates use in the state in which a sufficient space cannot be ensured, such as use on a seat table in a bullet train, for example.

The setting angle of the tablet terminal 30 in the second state b (angle of the display unit 31 with respect to the placement surface) is not limited to the angle depicted in FIG. 2C. For example, a smaller setting angle may be employed, for example, in the case of making a drawing or the like in some cases. Such a change in the setting angle can be carried out by changing the protective cover 20 to the protective cover 20 corresponding to the desired setting angle.

Furthermore, it is conceivable that several kinds of contrivance are made for the insertion unit 3 in view of preventing the digitizer 1 from dropping off from the protective cover 20 and the tablet terminal 30. To cite an example, a material having a high friction coefficient, such as silicone, may be used as a constituent material of the insertion unit 3 or plural protrusions may be provided on a surface of the insertion unit 3. If a change can be made also on the side of the protective cover 20 or the tablet terminal 30, male and female engaging parts may be provided on a respective one of the protective cover 20 or the tablet terminal 30 and the insertion unit 3 and the protective cover 20 or the tablet terminal 30 and the insertion unit 3 may be surely engaged with each other by these engaging parts. Whichever kind of contrivance is employed, friction between the insertion unit 3 and the base part 21 or the back surface 30*b* may be increased compared with the case in which no contrivance is employed, which can facilitate preventing the digitizer 1 from dropping off.

As described above, according to the digitizer 1 in accordance with the present embodiment, the digitizer 1 is not provided in the protective cover 20 and thus a general-purpose protective cover can be used as the protective cover 20. Furthermore, when the protective cover 20 is closed (first state), the state in which the digitizer 1 is sandwiched between the protective cover 20 and the tablet terminal 30 is obtained and thus it becomes possible to carry around the tablet terminal 30 and the digitizer 1 integrally. Moreover, when the protective cover 20 is opened (second state a and second state b), the digitizer 1 is deployed in front of the display unit 31 while being fixed to the tablet terminal 30. This makes it possible to comfortably use the digitizer 1, with the digitizer 1 connected to the tablet terminal 30, even when there may be space limitations.

Although example embodiments are described above, it is obvious that the present disclosure is not limited by such an embodiment at all and can be carried out in various forms without departing from the gist thereof.

Plural modification examples of the digitizer 1 according to the present embodiment will be specifically described below with reference to drawings according to need.

Figure 5A:
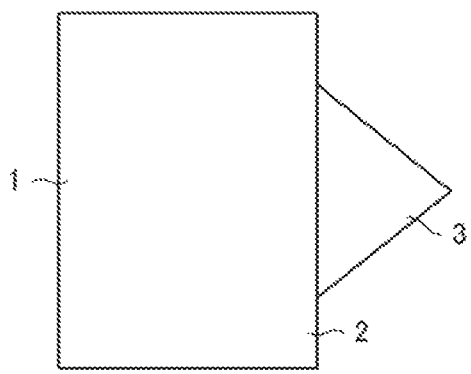
FIGS. 5A, 5B, and 5C are diagrams depicting modification examples of the configuration of the insertion unit.
Figure 5B:
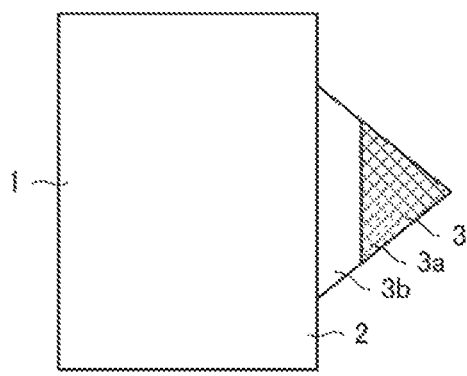
Figure 5C:
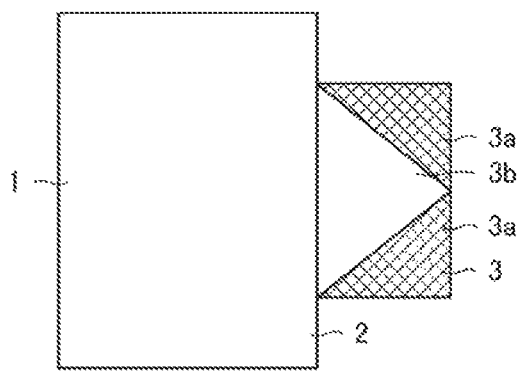

FIGS. 5A to 5C are diagrams depicting example modifications of the configuration of the insertion unit 3. FIG. 5A depicts an example in which the insertion unit 3 is formed into a shape of a triangle whose base is joined to the side surface of the indicator detecting unit 2. Forming the insertion unit 3 into a triangular shape in this manner may make it easier to insert the insertion unit 3 in between the base part 21 and the back surface 30*b* compared with the case of forming the insertion unit 3 into a rectangular shape as depicted in FIG. 1A. Although the example in which the insertion unit 3 is formed into a triangle is depicted here, this effect can be obtained by setting the width of the tip part of the insertion unit 3 smaller than the width of the base part (part joined to the indicator detecting unit 2) although there is a difference in the degree of the effect.

Besides, FIGS. 5B and 5C depict examples in which the insertion unit 3 is formed of two members 3*a* and 3*b* having different friction coefficients. The member 3*a* is a member whose friction coefficient is relatively low and is plastic for example. On the other hand, the member 3*b* is a member whose friction coefficient is relatively high and is silicone for example. In the example of FIG. 5B, the tip part (part near the vertex) of the triangular insertion unit 3 depicted in FIG. 5A is formed of the member 3*a* and the other part is formed of the member 3*b*. Besides, in the example of FIG. 5C, the part equivalent to the triangle depicted in FIG. 5A (first part) in the rectangular insertion unit 3 depicted in FIG. 1A is formed of the member 3*b* and the other part (second part) is formed of the member 3*a*. This can facilitate the insertion in between the base part 21 and the back surface 30*b* while ensuring friction between the insertion unit 3 and the back surface 30*b* of the tablet terminal 30 and the base part 21 of the protective cover 20.

As modification examples of the insertion unit 3, other various modification examples are also conceivable although not depicted in the diagram. For example, in the above-described embodiment and the above-described respective modification examples, the insertion unit 3 is formed to extend in the transverse direction of the indicator detecting unit 2. However, the insertion unit 3 does not necessarily need to extend in the transverse direction. Furthermore, in the above-described embodiment and the above-described respective modification examples, description is made on the basis of the premise that the insertion unit 3 and the indicator detecting unit 2 are units formed monolithically with each other. However, they may be formed as units of separate bodies and be used in the state of being engaged with each other by any attachment section. Moreover, plural insertion units 3 may be provided although only one insertion unit 3 is formed in the above-described embodiment and the above-described respective modification examples.

Furthermore, the protrusion length of the insertion unit 3 (length in the horizontal direction in FIG. 1A) is not limited to the lengths depicted in FIGS. 1A and 1B and FIGS. 5A to 5C. When the protrusion length is set longer, the digitizer 1 may be prevented from dropping off more surely. On the other hand, when the protrusion length is set shorter, the insertion in between the base part 21 and the back surface 30*b* may be made easier.

Part or all of the insertion unit 3 may be formed of an elastic member. This may make it easier to hold the digitizer 1 between the tablet terminal 30 and the protective cover 20. Furthermore, the thickness of the insertion unit 3 may be set uniform or the insertion unit 3 may be formed to gradually become thinner toward the tip part. Forming the insertion unit 3 of the latter can facilitate the insertion in between the base part 21 and the back surface 30*b* while ensuring friction between the insertion unit 3 and the back surface 30*b* of the tablet terminal 30 and the base part 21 of the protective cover 20 by the relatively-thick part.

Figure 6:
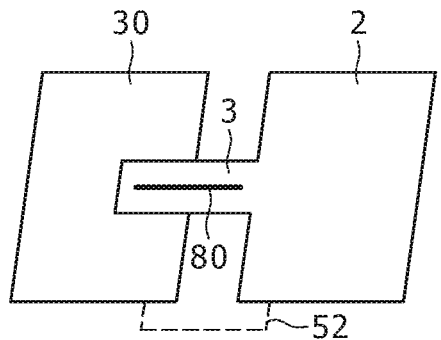
FIG. 6 is a diagram depicting another modification example configuration of an insertion unit.

FIG. 6 is a diagram depicting another modification example of the configuration of the insertion unit 3. In this modification example, a folding sensor 80 for detecting the folding state of the insertion unit 3 is incorporated in the insertion unit 3. Using the output of the folding sensor 80 allows the tablet terminal 30 to determine which of the states of FIGS. 2A to 2C the insertion unit 3 is in. Therefore, for example in the case of supplying power for the digitizer 1 from the tablet terminal 30 as depicted in FIGS. 3A, 3B, and 3D, the supply of the power to the digitizer 1 can be flexibly carried out in the following manner. For example, the power is not supplied to the digitizer 1 in the state of FIG. 2A and the power may be supplied to the digitizer 1 in the states of FIGS. 2B and 2C. This enables power saving of the tablet terminal 30.

In the above-described embodiment, a section configured to fix the indicator detecting unit 2 to the protective cover 20 is not particularly provided. However, such section may be provided for one or both of the digitizer 1 and the protective cover 20. Specifically, the following configurations are conceivable: a configuration in which the indicator detecting unit 2 is provided with a projecting part (or a recess part) and the protective cover 20 is provided with a recess part (or a projecting part); and a configuration in which the indicator detecting unit 2 and the protective cover 20 are bonded to each other by using a hook-and-loop fastener such as Magic Tape (registered trademark). Fixing the indicator detecting unit 2 to the protective cover 20 in this manner can prevent the indicator detecting unit 2 from being laterally shifted relative to the protective cover 20. However, in some cases, it may be preferable that the indicator detecting unit 2 be separated from the protective cover 20 as depicted in FIG. 2C. Therefore, in an embodiment, the section configured to fix the indicator detecting unit 2 to the protective cover 20 may be configured to allow the indicator detecting unit 2 to be easily removed from the protective cover 20.

Figure 7A:
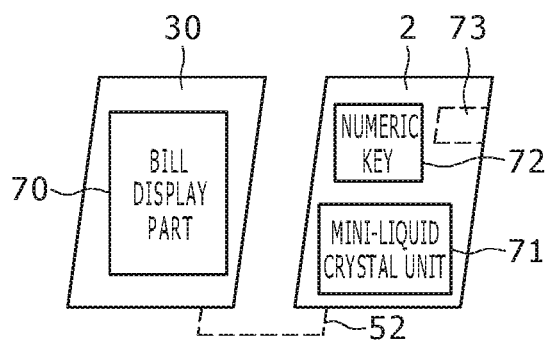
FIGS. 7A and 7B are diagrams depicting a modification example of the configuration of the indicator detecting unit.
Figure 7B:
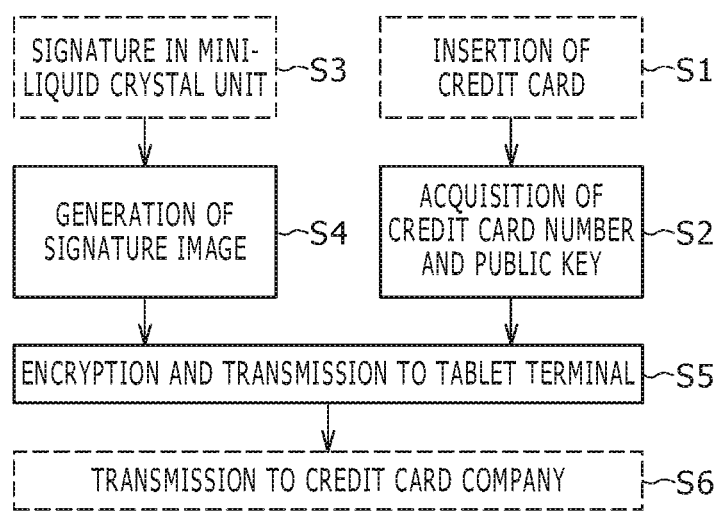

FIGS. 7A and 7B are diagrams depicting a modification example of the configuration of the indicator detecting unit 2. This modification example is suitable for e.g. the case in which an insurance salesperson of a life insurance company uses a general-purpose tablet terminal 30 as a settlement terminal. FIG. 7A depicts the configuration of each of the indicator detecting unit 2 and the tablet terminal 30 according to the present modification example and FIG. 7B depicts a flow diagram depicting the flow of processing according to the present modification example.

If the tablet terminal 30 is general-purpose equipment, various applications can be installed thereon. This means that an application having a function of stealing credit card information can also be installed thereon. Therefore, in the case of a customer having high security literacy, the customer hesitates to directly input credit card information to the tablet terminal 30 of an insurance salesperson. This causes the occurrence of a situation in which the customer does not input the credit card information although the insurance salesperson encourages the customer to input the credit card information and credit card settlement cannot be carried out. If the tablet terminal 30 is a dedicated terminal prepared by a life insurance company, it can be thought that such a situation does not occur because the life insurance company itself has credence. However, the general-purpose equipment also has advantages specific to the general-purpose equipment (development of hardware is unnecessary, and so forth) and therefore it is not necessarily preferable to prepare the dedicated terminal. The present modification example is made in view of such a circumstance and is to provide the digitizer 1 with which the possibility of that credit card settlement is rejected as described above can be reduced by using a dedicated product only as the digitizer 1 while using general-purpose equipment as the tablet terminal 30. A detailed description will be made below.

As depicted in FIG. 7A, the indicator detecting unit 2 according to the present modification example is configured to have a mini-liquid crystal unit 71, a numeric key 72, and a credit card slot 73 in addition to the above-described respective configurations. Furthermore, the tablet terminal 30 is configured to functionally have a bill display part 70. Of these configurations, the mini-liquid crystal unit 71 is provided to overlap with part of the touch sensor 10 depicted in FIG. 1A and so forth and forms a touch screen. Furthermore, the indicator detecting unit 2 is provided with a micro-processing unit (MPU) that controls operation of the indicator detecting unit 2 to be described later although not depicted in the diagram. The bill display part 70 is a functional part that displays the amount of money as the object of settlement on the display unit 31 depicted in FIG. 1A and so forth. The operation of the indicator detecting unit 2 and the tablet terminal 30 according to the present modification example will be described below with reference to FIG. 7B.

First, a customer who has checked displaying on the bill display part 70 inserts a credit card in the credit card slot 73 (step S1). Thereupon, the indicator detecting unit 2 reads a credit card number and a public key from the credit card (step S2). That is, the indicator detecting unit 2 according to the present modification example functions as an identification information acquiring unit that acquires the credit card information (identification information) and functions as an encryption key acquiring unit that acquires an encryption key (in this case, public key) for encrypting the credit card number later. Furthermore, in conjunction with the insertion of the credit card, the indicator detecting unit 2 causes the customer to write a signature in the mini-liquid crystal unit 71 by the electronic pen 41 (see FIG. 2C) (step S3). The indicator detecting unit 2 generates a signature image from a series of coordinate data obtained as the result (step S4). That is, the indicator detecting unit 2 according to the present modification example also functions as a signature image acquiring unit that acquires a signature image on the basis of the detection result of the touch sensor 10.

Subsequently, the indicator detecting unit 2 encrypts the credit card number read in the step S2 and the signature image generated in the step S4 by the encryption key read in the step S2 and transmits the encrypted information to the tablet terminal 30 (step S5). That is, the indicator detecting unit 2 according to the present modification example also functions as an encryption processing unit that encrypts a credit card number and a signature image by an acquired encryption key. The tablet terminal 30 transfers the information received from the digitizer 1 to a server of a credit card company (step S6). The credit card company has a secret key corresponding to the public key read in the step S2 and thus can obtain the credit card number and the signature image by decrypting the information received from the tablet terminal 30 by using the secret key.

As above, according to the present modification information, it becomes possible to transmit a credit card number and a signature image from the digitizer 1 to a server of a credit card company without allowing the tablet terminal 30 to come to know the raw credit card number. Therefore, as long as the premise that a life insurance company has sufficient credence exists, even when the tablet terminal 30 is general-purpose equipment, the possibility of rejection of credit card settlement by the customer can be reduced by emphasizing that the digitizer 1 is a dedicated terminal of the life insurance company.

Although the example in which the tablet terminal 30 is a settlement terminal for an insurance salesperson of a life insurance company is described here, it is obvious that the configurations depicted in FIGS. 7A and 7B can be applied also to the case in which the tablet terminal 30 is used for another purpose.

Furthermore, in the above description, a credit card number is read from a credit card inserted in the credit card slot 73. However, the credit card number may be input from the numeric key 72 without using the actual thing of the credit card. However, in this case, the indicator detecting unit 2 cannot acquire the public key of the credit card. Therefore, for example, the user may be made to input the personal identification number of the credit card from the numeric key 72 and the credit card number and a signature image may be encrypted by using the personal identification number as the above-described encryption key. Because the personal identification number of the credit card is held in a server of a credit card company, the server of the credit card company can decrypt the credit card number and the signature image encrypted in this manner.

Moreover, the configurations depicted in FIGS. 7A and 7B can be favorably applied also to the case of reading cards other than the credit card, e.g. various kinds of point cards or the like, and so forth. In addition, the configurations depicted in FIGS. 7A and 7B can be favorably applied also to the case of using the tablet terminal 30 irrespective of the card. That is, the configurations depicted in FIGS. 7A and 7B can be favorably applied to the case in which a user has some kind of identification number and there is a need to make the user input the identification number from a card or the numeric key 72.

Besides, the following functions may be added as functions of the tablet terminal 30.

A first function is a function of adjusting the display direction of the display unit 31. It is general that the tablet terminal 30 has a function of adjusting the orientation of the screen according to the orientation of the terminal. In the present modification example, the following function is added to this function: a function of adjusting the orientation of the screen to cause the one side adjacent to the digitizer 1 among the four sides of the display unit 31 to become the lower side in displaying when the digitizer 1 is connected (for example when the above-described connection in an upper layer is started). This makes it possible to favorably carry out touch input when the digitizer 1 is used in the state depicted in FIG. 2C for example.

A second function is a function of adjusting the effective range of the touch sensor 10 of the digitizer 1 in accordance with the screen aspect ratio of the display unit 31. This allows the aspect ratio of the touch sensor 10 to match the screen aspect ratio of the display unit 31.

A third function is a function of switching the digitizer 1 between the enabled state and the disabled state depending on an application. This enables flexible use of the digitizer 1, such as use of the digitizer 1 only in signature writing for example.

A fourth function is a function of notifying the digitizer 1 of a frame for writing. In this case, in an embodiment, LEDs may be disposed in a matrix manner in the touch screen of the digitizer 1. This can clearly indicate, on the touch screen, the area on the touch screen in which a signature should be written in the case of making a user write the signature for example.

It is to be noted that embodiments of the present disclosure are not limited to the foregoing, and that various changes can be made without departing from the spirit of the present disclosure.

What is claimed is:

1. A device, comprising:
a detection portion having a plate shape and including a first set of one or more indication sensors, which, in operation, detects one or more indications; and
a securing portion extending from the detection portion and configured to secure the device to a piece of electronic equipment having a plate shape, a back and a front, the front including a display with a second set of one or more indication sensors, wherein the back of the piece of electronic equipment is configured to be covered by a base of a protective cover, the protective cover being separate from the securing portion, wherein the securing portion is configured to fit between the back of the piece of electronic equipment and the base of the protective cover to secure the device to the piece of electronic equipment, and wherein the securing portion is configured to prevent the detection portion from dropping off the protective cover while the securing portion is disposed between the back of the piece of electronic equipment and the base of the protective cover.

2. The device of claim 1, comprising:
a transmitter, which, in operation, transmits signals to the piece of electronic equipment based on indications detected by the first set of one or more indication sensors.

3. The device of claim 1 wherein the securing portion is secured between the back of the piece of electronic equipment and the base part of the protective cover by friction.

4. The device of claim 1 wherein the protective cover has a flap and when the flap is in a closed position, the first set of one or more indication sensors face the second set of one or more indication sensors.

5. The device of claim 1 wherein the first set of one or more indication sensors comprises a plurality of electrodes positioned in a front surface of the detection portion.

6. The device of claim 1 wherein at least one of the first set of one or more indication sensors is of a type different than a type of at least one of the second set of one or more indication sensors.

7. The device of claim 1 wherein the securing portion has a rectangular shape with a side joined to a side surface of the detection portion.

8. The device of claim 7 wherein a first part of the securing portion has a triangular shape with a base joined to the side surface of the detection portion and a friction coefficient higher than a friction coefficient of a second part of the securing portion.

9. The device of claim 1 wherein the securing portion has a triangular shape with a base region joined to a side surface of the detection portion.

10. The device of claim 9 wherein the securing portion has a friction coefficient in a vertex region which is lower than a friction coefficient of the base region.

11. The device of claim 1 wherein the protective cover has a flap, the flap configured to cover a back of the detecting portion.

12. The device of claim 1, comprising:
a sensor, which, in operation, detects an orientation of the detection portion with respect to the securing portion.

13. The device of claim 1 wherein the detection portion, in operation:
acquires identification information;
acquires a signature image;
encrypts the identification information and the signature image based on an encryption key; and
transmits the encrypted identification information and the signature page to the piece of electronic equipment.

14. A system, comprising:
a first sensing device having:
a plate-shaped body including one or more sensors; and
a protrusion extending from the body; and
a protective cover that is separate from the protrusion, the protective cover having a base, the base configured to cover a back of a second plate-shaped sensing device, and the base having an opening sized and shaped to receive the protrusion, wherein the protrusion is configured to fit between the base of the protective cover and the back of the second sensing device to secure the first sensing device to the second sensing device, and wherein the protrusion is configured to prevent the first sensing device from dropping off the protective cover while the protrusion is disposed between the back of the second sensing device and the base of the protective cover.

15. The system of claim 14, comprising:
the second sensing device.

16. The system of claim 15 wherein the first sensing device comprises a communication interface, which, in operation, communicatively couples the first sensing device to the second sensing device.

17. The system of claim 15 wherein the first sensing device is of a type different than a type of the second sensing device.

* * * * *